(12) United States Patent
Babuska et al.

(10) Patent No.: US 12,492,737 B2
(45) Date of Patent: Dec. 9, 2025

(54) RETAINING MESH FOR AN OPEN SOCKET JOINT

(71) Applicant: The Aerospace Corporation, El Segundo, CA (US)

(72) Inventors: Pavel Babuska, El Segundo, CA (US); Vinay K. Goyal, El Segundo, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 402 days.

(21) Appl. No.: 18/161,345

(22) Filed: Jan. 30, 2023

(65) Prior Publication Data
US 2024/0255042 A1    Aug. 1, 2024

(51) Int. Cl.
*E04C 5/12*     (2006.01)
*F16G 11/04*    (2006.01)

(52) U.S. Cl.
CPC .................. *F16G 11/042* (2013.01)

(58) Field of Classification Search
CPC ....... E04C 5/12; F16G 11/042; Y10T 24/3909
See application file for complete search history.

(56) References Cited

U.S. PATENT DOCUMENTS

| | | | | |
|---|---|---|---|---|
| 3,660,887 | A * | 5/1972 | Davis | B29C 70/76 403/267 |
| 4,279,531 | A * | 7/1981 | McKenzie | F16G 11/05 403/275 |
| 4,673,309 | A * | 6/1987 | Schlaich | F16G 11/05 403/275 |
| 5,415,490 | A * | 5/1995 | Flory | F16G 11/042 403/267 |
| 6,578,329 | B1 * | 6/2003 | Stubler | E04C 5/122 52/223.13 |
| 10,458,063 | B2 * | 10/2019 | Yamazaki | E04C 5/12 |
| 10,895,116 | B2 * | 1/2021 | Gormican | F16B 7/025 |
| 11,391,312 | B2 * | 7/2022 | Gormican | F16B 2/14 |
| 2014/0137388 | A1 * | 5/2014 | Campbell | F16G 11/025 29/461 |
| 2016/0362939 | A1 * | 12/2016 | Sjostedt | E21B 17/0426 |
| 2018/0051522 | A1 * | 2/2018 | Sjostedt | E21B 17/042 |

* cited by examiner

*Primary Examiner* — Jason W San
*Assistant Examiner* — Michael S Lee
(74) *Attorney, Agent, or Firm* — LeonardPatel PC

(57) ABSTRACT

An open socket joint configured to prevent zinc creep includes a retaining mesh that sits on a lip of an outer shell casing of the open socket joint. The retaining mesh is configured to prevent zinc within the open socket joint to extrude.

20 Claims, 8 Drawing Sheets
(2 of 8 Drawing Sheet(s) Filed in Color)

500

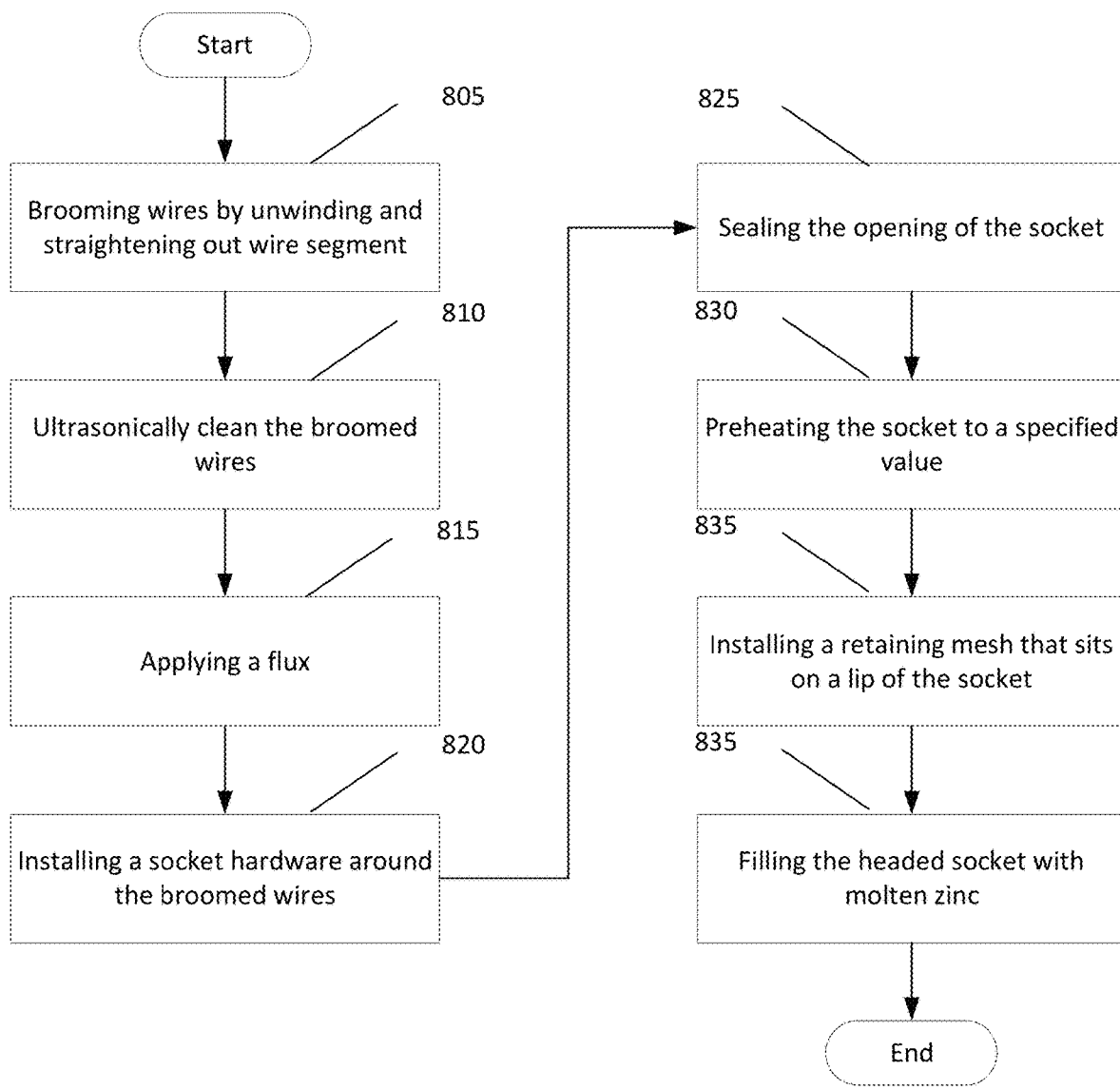

RETAINING MESH FOR AN OPEN SOCKET JOINT

FIELD

The present invention relates to open socket joints, and more particularly, to a retaining mesh for an open socket joint to prevent zinc creep.

BACKGROUND

Zinc spelter socket joints are terminations in stay cables used throughout industry that transfer loads between adjacent structures. This type of open spelter socket joint is extensively used in structural applications because the open spelter socket joint is highly efficient and reliable. The open zinc spelter socket joint was used in the Aux M4N cable, which is the cable that failed and instigated the chain of events leading to the collapse of the Arecibo Observatory. The cable failed near the joint where the cable connects with the open zinc spelter socket. See FIG. 1, which are diagrams of related art illustrating (a) open spelter socket drawing, (b) socket terminology, (c) Aux M4N broomed wire reconstruction, (d) 1×127 structural strand cross section, and (e) cable-socket interface detail sketch.

As shown in image (c), Aux M4N structural strand follows a 1×127 construction and includes 126 individual 0.25-inch diameter wires wrapped around a single, seven-wire strand in six concentric rings with a pattern of 6, 12, 18, 24, 30, and 36 wires. Terminations consist of stay cable wires that are unraveled, broomed, and then embedded/bonded into a zinc casting inside a conical volume. Cable tension wedges the zinc material against the slanted conical surface, which then develops a large compression zone within the zinc such that if a failure were to occur it is expected to be outside the socket joint in the cable span.

Cable tensions from observatory dead load, operational loads, and survival transients are transmitted to the socket termination through the 126 individually broomed wires that are otherwise held in place by the cast zinc spelter within the steel open socket conical volume. See FIG. 1, image (c). The zinc that fills the socket cavity is bonded to the wires, and this bond creates an efficient load transfer among the wires within the socket. A special characteristic of the zinc spelter socket termination is that the combination of zinc plasticity and the conical volume forces a "squeezing" effect to occur around the broomed wire bundle in the narrow part of the socket. The high confining pressures experienced at the outlet of the socket keep the broomed wires from pulling out of the zinc and allow the failure to occur in the cable outside the socket, thus realizing the cables' full structural capability, otherwise referred to as a 100% efficiency termination.

In the Arecibo observatory failure, a combination of low design margin at the socket termination and a high percentage of sustained loading revealed an unexpected vulnerability to zinc creep and environments, resulting in long-term cumulative damage and progressive zinc/wire failure. The resulting core-pullout failure mode that preceded observatory collapse was found to be (1) unique compared with other industry applications, (2) insufficiently addressed within existing standards, and (3) a potential risk for similar designs.

In-service inspections showed evidence of progressive zinc extrusion on several Arecibo sockets, which in hindsight indicated that an appreciable amount of damage had accumulated within the socket. However, the design did not contain set service-life inspection intervals with pass/fail inspection criteria, nor did it specify an end-of-life capability requirement associated with service life degradation, and the sockets remained in-service as the evidence was not tied to an understanding of need for action.

Governing ASCE Cable Standards

ASCE/SEI 19-22 "Structural Applications of Steel Cables for Buildings"] replaces ASCE Standard 19-16, and it is an expanded and revised version of ASCE 19-16. This standard provides requirements for the structural design for use as static structural elements for the support and bracing of buildings and other cable-supported structures.

The cable standard ASCE 19 was originally published in 1966 and was developed for structural applications of steel cables for buildings and was published by the American Iron and Steel Institute (AISI). Later publications include "Design Fundamentals of Cable Roof Structures" published by AISI in 1969; "Cable-Suspended Roof Construction State-of-the-Art" in the Journal of the Structural Division, ASCE, 1971; and the Manual for Structural Applications of Steel Cables for Buildings, AISI, 1973. Since then, the standard continued to be revised to incorporate industry lessons learned and recommendations. Prior editions of the ASCE/SEI 19-22 include ASCE 19-96, ASCE/SEI 19-10, and ASCE/SEI 19-16.

Consideration of the Environments

Temperature changes cause fluctuating loads in the cables and affect the mechanical performance of the constituent materials of the cable assembly, particularly the constituents within the socket termination. Higher temperature exposure can reduce strength capability of these joints. Cold temperature exposure can cause embrittlement of the constituent materials and cause the joint to have less ductility and consequently, less load redistribution. Thus, an alternative design should account for changes to the mechanical and physical properties of cables and end fittings when these joints are subjected to temperature extremes. The characterization of these properties can be accomplished by coupon or subscale tests that are environmentally conditioned to the in-service predicted temperature extremes.

Fatigue

Fluctuating loads in the cable is caused by temperature fluctuations, vibrations from winds, rain, or earthquakes, and from operational use. Conceptually, every cycle experienced by the cable during service decreases cable strength capability over time. Consequently, cable fatigue life should be evaluated to ensure robustness to fatigue environments. When designing the cable, the effect of mean load and load configuration should be accounted for in the fatigue assessment. An effective approach to achieving "infinite" life in the cable constituents is to use an endurance diagram. When the mean stress is non-zero, the Goodman diagram developed by plotting the alternating stress in the vertical axis, and the mean stress in the horizontal axis. A straight line is drawn between the material's endurance limit on the vertical axis, and the ultimate tensile strength on the horizontal axis. A point in this diagram represents the operational conditions of the socket, and if it lies below the line then the material is unlikely to fail during the lifetime of the cable. Otherwise, the socket joint will have a finite life. In these cases, full-scale fatigue testing can be accomplished by subjecting the socket joint to cyclic loading. Because the socket joint will see millions of cycles from different sources of loading, Miner's rule or an alternate cumulative damage approach can be used to formulate a test program where an equivalent fatigue damage is induced by testing the socket joint to larger amplitude loading and a smaller number of cycles.

Creep

Long-term sustained loading conditions can cause the cable to gradually elongate over time and cause the material within the socket to degrade. The design of cable components should account for creep, which depends both on applied stress and temperature. In the Arecibo failure investigation, zinc creep was one of the primary failure mechanisms, which was activated by a high percentage of sustained (dead) load and a design factor of safety of approximately 2.0 on ultimate strength. This visually manifested as zinc extrusion from the socket and was shown to further reduce structural capability of the individual wires comprising the cable at the socket termination.

The effect of temperature is evaluated based on the percentage of a structural material's absolute melting temperature Tm in Kelvin. Under sufficiently high sustained loads, creep in typical metallic components becomes a concern at temperatures as low as 0.4×Tm. For commercially pure zinc used in zinc spelter socket terminations, room temperature (roughly 70° F.) is above the 0.4×Tm homologous temperature and demonstrates susceptibility to creep. This is not the case for the cast steel socket or the steel wires comprising the cable because their homologous temperature at ambient air conditions is much less than 0.4×Tm. The susceptibility for the creep failure mode depends on service temperature range, stress level, duration of stress applied, and which phase of the creep process the material is experiencing.

Since creep is challenging to predict and to test, socket joints can be designed to preclude creep failure modes by material selection or inspections can be instituted over the life of the socket joint to that would trigger a repair. Otherwise, significant efforts are required to develop high-confidence predictive creep models that are anchored to sub-element testing. Full-scale tests could be impractical to formulate as they would need to be conducted in a short period of time but need to simulate long-service lives.

Cumulative Damage

The design of end fittings should meet fatigue and creep life requirements and consider the cumulative damage combination of fatigue and creep failure modes. Generally, materials incur cumulative damage due to both sustained and cyclic loading, as structures are not likely operating in conditions where one of the contributors is totally absent. Accumulation of damage occurring due to sustained and cyclic loading can be linearly combined using Miner's rule.

FIG. 2 is a graph 200 illustrating cumulative damage in materials due to a combination of creep and fatigue. In graph 200, n and Na are the number of cycles and the allowable number of cycles for the j-th loading condition; t and Ta are the actual time at stress level k and the allowable time at that stress level. D is the allowable combined damage fraction.

The point of graph 200 is simply to illustrate that time-dependent degradation modes are not only due to sustained loading alone, but that cyclic loading can accelerate creep-related failure modes. Graph 200 shows an example exchange rate between cyclic and time-dependent contributors to total accumulated damage.

The individual failed wires in the Arecibo Aux M4N cable did not reveal any evidence of fatigue from the microstructural forensic studies that were conducted. The large-sustained loading (compared to other fluctuating loads) resulted primarily in creep of the zinc, which progressively transferred load into the outer cable wires, eventually overloading the wires one-by-one until the net section of zinc gave way to pull the cable from the socket. Fluctuating loads from observatory motion, winds, earthquakes, and temperature fluctuations likely added additional damage into the socket joint until failure occurred. The combination of mechanisms should be accounted for in the design of cable supported structures.

Accordingly, an improved technique to prevent zinc creep inside of the open socket may be beneficial.

SUMMARY

Certain embodiments of the present invention may provide solutions to the problems and needs in the art that have not yet been fully identified, appreciated, or solved by current open socket joint technologies. For example, some embodiments of the present invention pertain to an open socket joint that includes a retaining metallic mesh that sits on the lip of an outer shell casing of the open socket joint.

In one embodiment, an open socket joint configured to prevent zinc creep includes a retaining mesh comprising a plurality of holes configured to prevent zinc within the open socket joint to extrude. The retaining mesh sits on a lip of an outer shell casing of the open socket joint

BRIEF DESCRIPTION OF THE DRAWINGS

The patent or application file contains at least one drawing executed in color. Copies of this patent or patent application publication with color drawing(s) will be provided by the Office upon request and payment of the necessary fee. In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 8 is a flow diagram illustrating a method for constructing an open socket joint to prevent zinc creep in an open socket joint, according to an embodiment of the present invention.

DETAILED DESCRIPTION OF THE EMBODIMENTS

Figure 1:
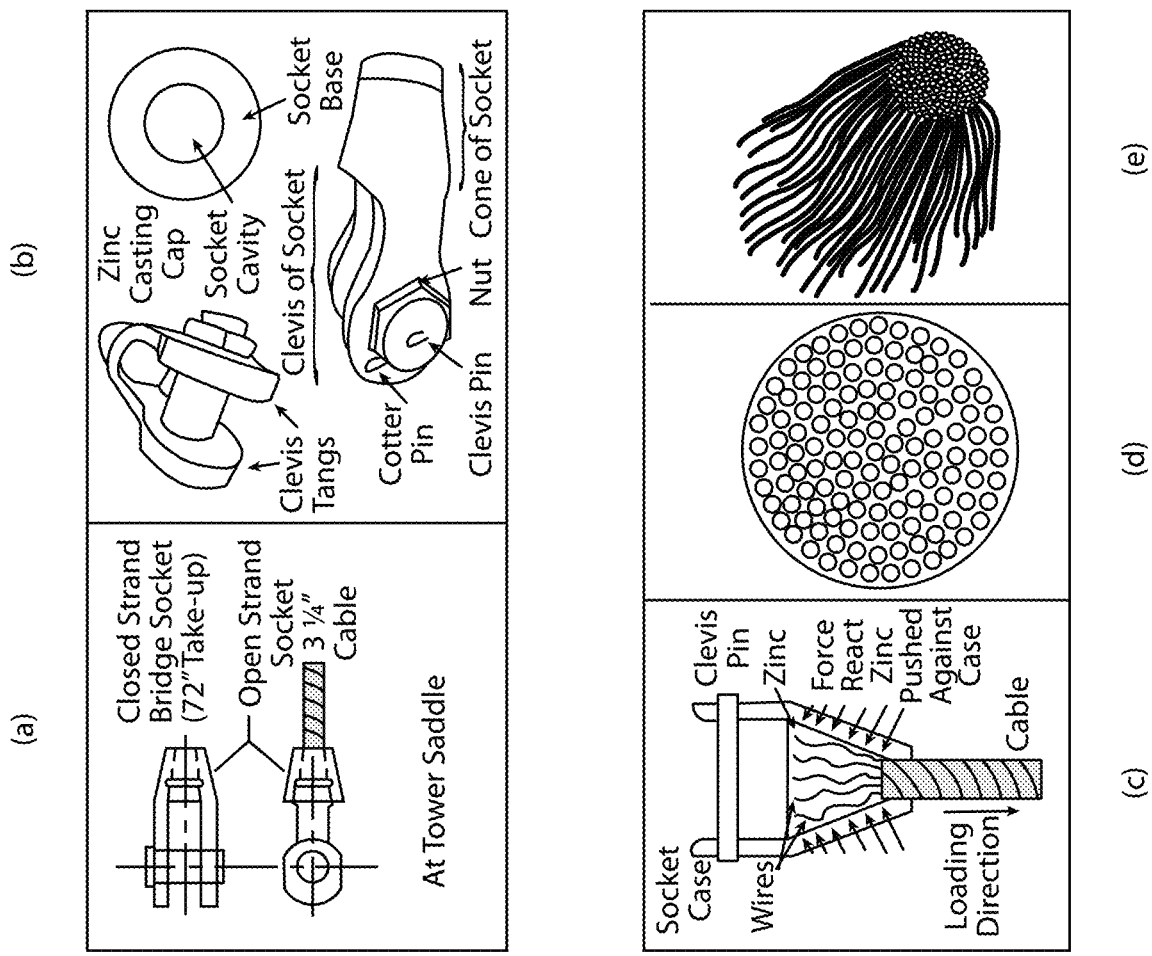
FIG. 1 are diagrams of related art illustrating (a) open spelter socket drawing, (b) socket terminology, (c) Aux M4N broomed wire reconstruction, (d) 1×127 structural strand cross section, and (e) cable-socket interface detail sketch.
Figure 2:
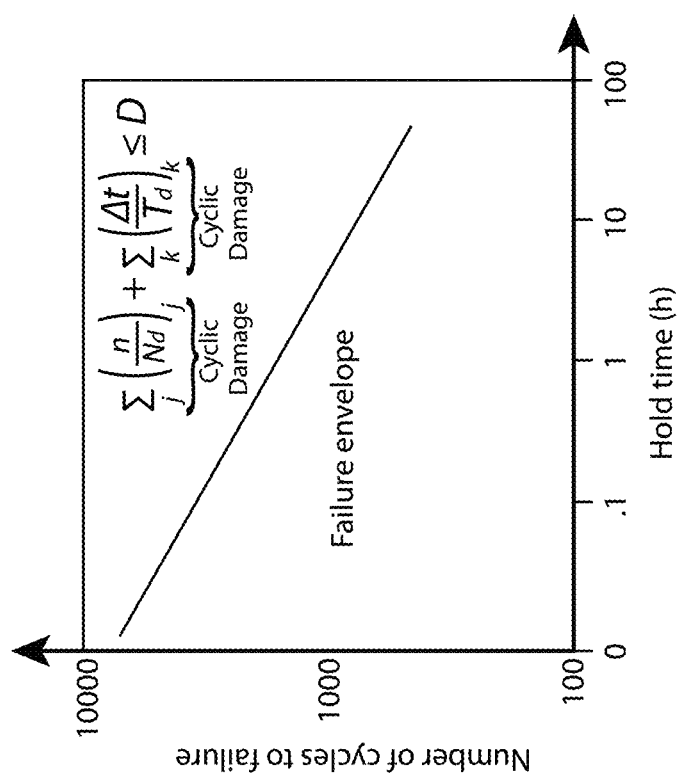
FIG. 2 is a graph illustrating cumulative damage in materials due to a combination of creep and fatigue.

Some embodiments of the present invention pertain to an open socket joint that includes a retaining metallic mesh that sits on the lip of an outer shell casing of the open socket joint. The mesh prevents the zinc within the socket to extrude. This provides a consistent failure mode to the outside of the socket joint, which is the preferred failure mode in these applications so as to ensure repeatable failure modes and more reliability of these cable assembly designs.

It should be noted that there are at least six design and test practices to be considered for the open socket joint configuration. One consideration, for example, is to keep the failure away from the joint by designing the socket joint to be stronger than the cable improving design reliability by ensuring a repetitive failure mode and increasing certainty in the capability of the design.

Another consideration is to take into account a sufficiently high design factor of safety to preclude difficult-to-predict failure mechanisms such as creep and fatigue. Analysis methods may not be able to predict the failure capacity of these socket joints, due to the complexity in failure modes. In aerospace applications, a factor of safety of near 4.0 on strength and a proof factor of 1.5 over the maximum predicted load in service has been shown to result in robust fatigue life.

A further consideration is the qualification test should include worst-case manufacturing imperfections that validate accept/reject defect criteria. These defect acceptance criteria can be used for post-fabrication screening, post-proof inspections, and in-service maintenance inspections.

While ASCE 19 standards allude to redundancy, some embodiments take into account a key element in ensuring that the structural system is robust to local cable failures. The Arecibo radiotelescope cable failure led to other cables failing until ultimate collapse of the system. ASCE/SEI 7-16 requires that buildings be designed to be robust to local damage. For example, the building should not collapse if any column fails. Analogously, a cable structure should not collapse if one local element of the cable system is damaged, regardless of the cause.

If most of the total cable load is due to deadloads and the socket joint is designed to a factor of safety of 2.0, then the designer of spelter sockets should consider creep as a viable failure mode. This is of particular importance given the susceptibility of zinc to creep and the effects that zinc plasticity has on the wire stress levels. Below is a design, which is described in more detail, that could suppress creep failure mode.

Another factor to consider is keeping positive structural margins for each of the cable assembly constituents. In the Arecibo failure investigation, finite element analysis and forensic investigation of an open conical zinc spelter socket with 1×127 cable strand showed that at half of the cable breaking load, the stress distribution across wires was non-uniform and that the outer wires stresses were near ultimate strength but with residual elongation capability. Designing the socket joint or designing the system so that the maximum load applied to the cable results in positive structural margins for each failure mode within the socket joint increases design reliability. Traditionally, design/build verification methodologies for similar socket terminations did not consider constituent stresses and localized stress concentrations in demonstrating positive structural margins; consequently, these socket terminations may have been vulnerable to time-dependent cumulative damage from fatigue and creep.

It should be appreciated that open socket joints are effective because of the large confining pressure that forms within the zinc and acts around the broomed wire bundle in the narrow part of the socket. The high confining pressures keep the broomed wires from pulling out of the zinc and allow the failure to occur in the cable outside the socket. However, the design allows the zinc to extrude from the socket over time and the outer wire stresses are significant.

A good design would ensure that the highest wire stresses within the cable occur outside of the socket joint so that the failure mode is repeatable, and that zinc extrusion is reduced or eliminated.

Design Trade Studies

Figure 3:
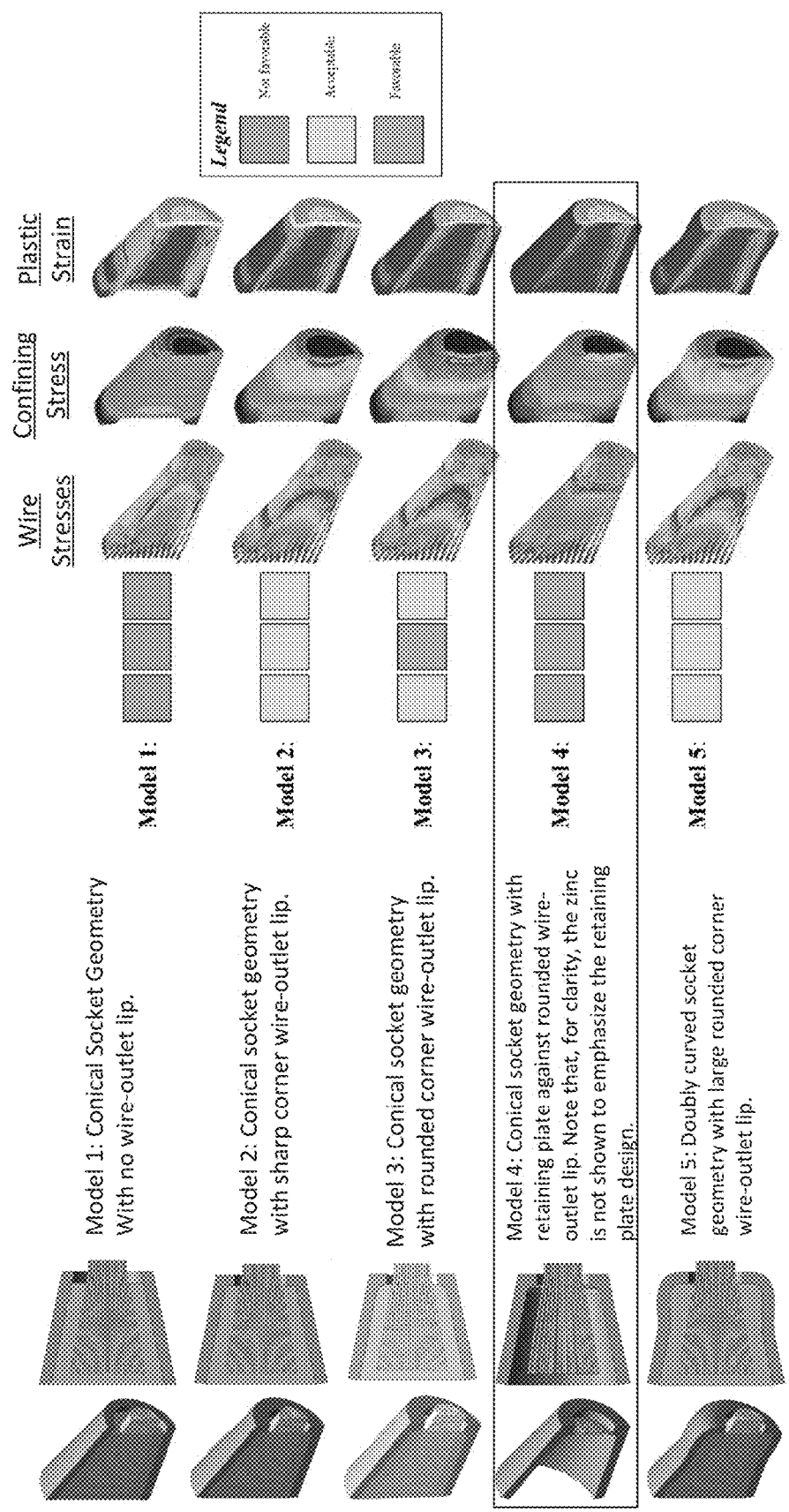
FIG. 3 illustrates conceptual models, according to an embodiment of the present invention.

FIG. 3 illustrates conceptual models 1-5, according to an embodiment of the present invention. In this embodiment, model 1 is a conical socket geometry with no wire-outlet lip, and model 2 is a conical socket geometry with sharp corner wire-outlet lip. FIG. 3 also illustrates conceptual model 3, which is a conical socket geometry with rounded corner wire-outlet lip, and model 4, which is a conical socket geometry with retaining mesh plate sitting against rounded wire-outlet lip. In model 4, the retainer mesh plate has holes where the individual wires pass-through. Note that, for clarity, the zinc is not shown to emphasize the retaining plate design. FIG. 3 also illustrates model 5, which is a doubly curved socket geometry with large-rounded corner wire-outlet lip. It should be noted that model 2, in FIG. 3, is the baseline model most representative of the Arecibo socket joint that had failed.

Finite Element Models

Figure 4:
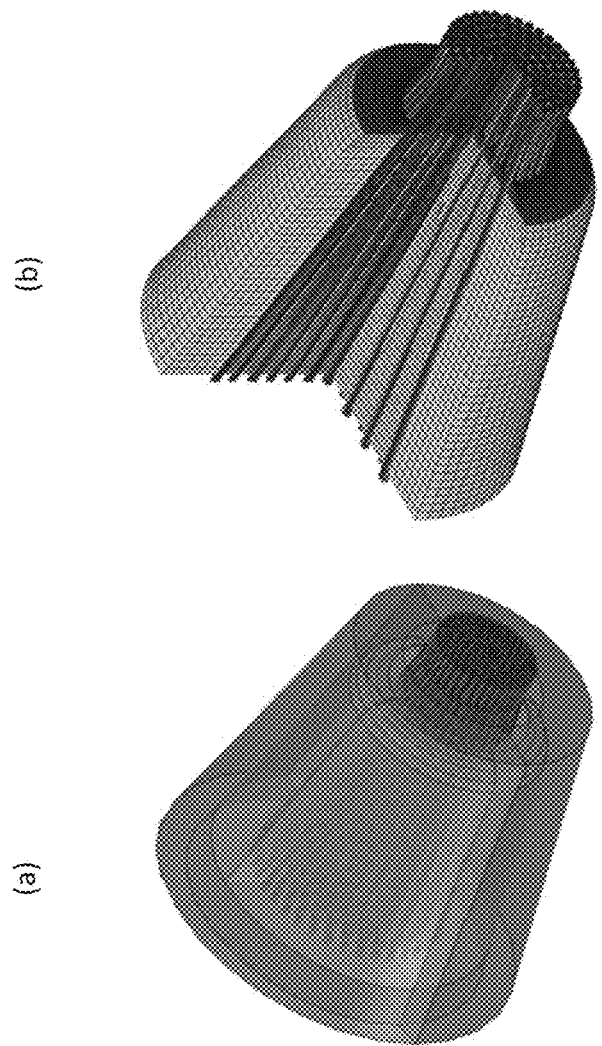
FIG. 4 is illustrating a model geometry isometric view (a) and section cut view (b) to show mesh density and refinement, according to an embodiment of the present invention.

Finite element analysis was conducted to examine the effects of socket geometry on critical stress characteristics of the socket termination constituents. A finite element model in full three-dimensional fidelity of each design trade was developed in the software Abaqus. A representative model is shown in FIG. 4, which illustrates a model geometry isometric view (a) and section cut view (b) to show mesh density and refinement, according to an embodiment of the present invention. The representative model under view (a) shows all the major features that comprise socket designs, including the socket housing (shown in transparent green), the 127 broomed wires from the structural strand (shown in red), the casting of zinc that surrounds the wires within the socket housing (shown in grey) and the retaining element at the outlet of wires from the zinc (shown in blue). In addition, the representative model under view (b) is an example mesh refinement for wires and zinc without the outer socket.

Several analytical studies found that the presence of the actual clevis joint of the socket did not affect the internal stresses developing in the wires and zinc. Therefore, in all trade studies, the representation of the socket was simplified to the conical outer shape and the appropriate inner geometry which restrains the zinc. The baseline set of mechanical properties are provided in Table 1.

TABLE 1

| Mechanical properties for the various cable assembly constituents. | | |
|---|---|---|
| Cast Steel Socket (A148 Grade 90-60 Cast Steel) | Commercially Pure Zinc | Structural Strand Wires (A586-91 Steel Cable) |
| Elastic Modules: 72 Msi Poisson's Ratio: 0.29 | Elastic Modules: 14 Msi Poisson's Ratio: 0.25 | Elastic Modules: 23 Msi Poisson's Ratio: 0.29 |

TABLE 1-continued

Mechanical properties for the various cable assembly constituents.

| Cast Steel Socket (A148 Grade 90-60 Cast Steel) | Commercially Pure Zinc | Structural Strand Wires (A586-91 Steel Cable) |
|---|---|---|
| Yield Strength: ~70 ksi Ultimate Strength: ~100 ksi | Ultimate Strength: ~10 ksi | Yield Strength: ~150 ksi Ultimate Strength: >220 ksi (min spec) |

Figure 5:
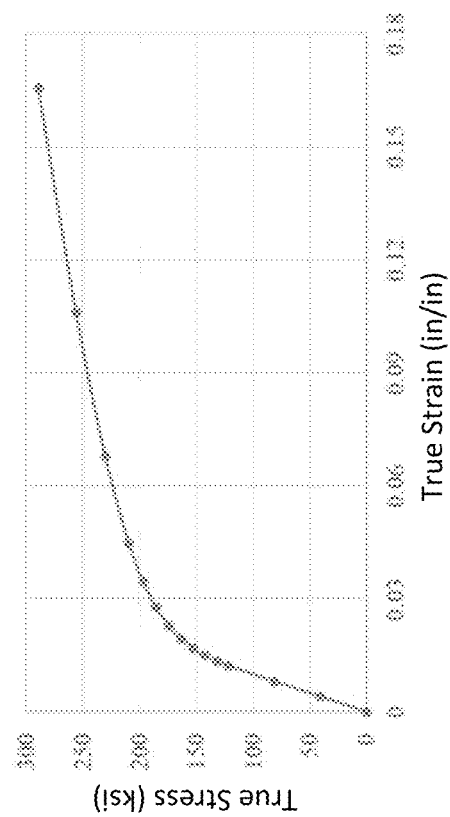
FIG. 5 is a graph illustrating a stress strain curve of A586-1 steel wires, according to an embodiment of the present invention.
Figure 6:
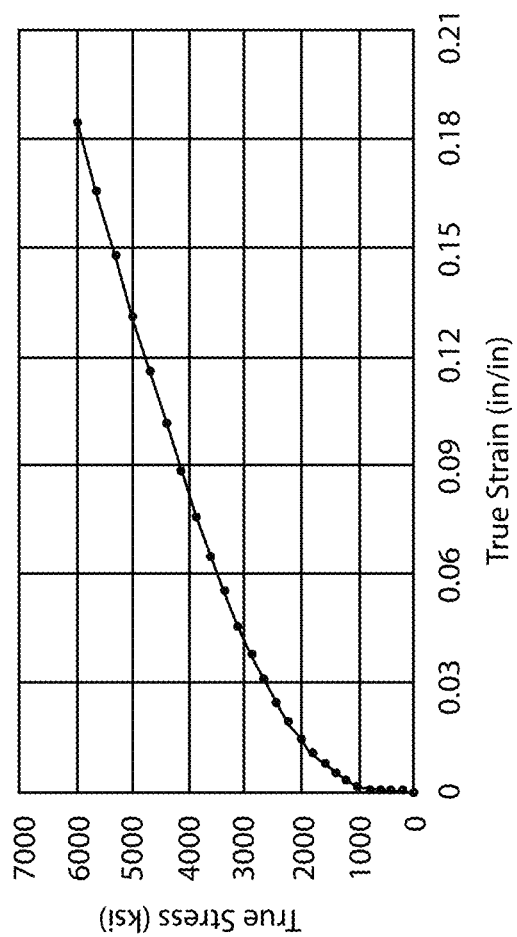
FIG. 6 is a graph illustrating a stress strain curve of commercially pure zinc, according to an embodiment of the present invention.

The nonlinear stress strain curved used for the individual wires comprising the cable was generated by Ramberg-Osgood relations to match available test data. See, for example, FIG. 5, which is a graph 500 illustrating a stress strain curve of A586-1 steel wires, according to an embodiment of the present invention. Commercially pure zinc is a unique structural material in structural socket terminations because its tensile capability is extremely low; however, its compressive capability is high. Grain sizes also vary significantly based on manufacturing method and rate of cooling during casting. As such, it is difficult to construct a high-confidence material model that accurately reflects both tension and compression response or when attempting to model progressive damage. However, a representative nonlinear zinc material curve was used in the analyses. See, for example, FIG. 6, which is a graph 600 illustrating a stress strain curve of commercially pure zinc, according to an embodiment of the present invention. In FIG. 6, graph 600 shows a representative true stress-strain curve for commercially pure zinc, which shows a comparably low yield strength to ultimate strength and high elongation capability. Such stress-strain relations were used as part of the material property inputs to the analysis of the socket design.

Design Trade Parameters

For a given set of reasonable material properties, the various design concepts were compared with particular emphasis on the effects of socket geometry on the zinc and wire stresses. See, for example FIG. 3, models 1 to 5. Extensive studies during the failure investigation found that the major failure modes in consideration for such designs involve individual wire stresses, location of peak confining pressure in zinc, and plastic strain of the zinc spelter. As such, the various design concepts are compared to each other according to wire stress, confining pressure, and zinc plastic strain to better develop and understanding of design sensitivities and qualitatively assess potential for design improvement. For example, FIG. 3 shows under the heading "wire stresses" a comparison of yield stress indices for each model 1-5. FIG. 3 also shows under the heading "confining stresses" a comparison of non-dimensional zinc confining pressure stresses, and under the heading "plastic strain" finally a comparison of zinc plastic strain for each model 1-5.

A qualitative system is established to rank the models 1-5 with respect to each other based on the critical stress parameters. The intent of the ranking is not to ascertain whether a design is acceptable or unacceptable, but rather to identify sensitivities to certain design parameters and explore any opportunity for improvement in the design space. As shown in FIG. 3, models 3 and 4 are the most favorable of the designs considered. The colored squares register the ranking from left to right in accordance with the columns of values being examined (wire stresses, confining stress, and plastic strain). Model 4 in particular is the best design based on (1) concentrated region of stresses in the wires near the socket outlet indicating a location of wire failure outside the socket, (2) locally high confining pressure near the socket outlet with uniform compression elsewhere and (3) the lowest plastic strains in the zinc of any of the designs, indicating that the propensity for zinc creep is the lowest.

The ranking of the various design subtleties was based on extensive studies on representative socket design for 1×127 structural strand to material property variabilities, voids, repeated loading, individual wire brooming, modeling simplifications, and damage progression. Throughout the complete body of analysis trade studies, it was learned that a good socket design is one where the cable develops complete strength while a net section cable failure occurs outside the socket joint. Further, the time-dependent failure modes, such as creep and fatigue, are nearly impossible to detect if the critical regions of stress are not accessible for visual inspection or apparent from the outside of the joint. As such, it is qualitatively more desirable to have (1) critical stresses in the wires be outside the socket termination, (2) low magnitude of plastic strain bands in the zinc to minimize the occurrence and rates of zinc creep, and (3) high confining pressure on the wires nearest to the wire outlet from the socket to constrain the wires from slipping and create a locally expected location for failure at the socket.

It is noted that the cone-only socket (see model 1), which does not contain any geometric lip feature at the wire outlet, is generally the worst performer across all three categories. The sockets containing geometric lip features, whether as a corner, round, or with a double-curved socket housing all show improved confining pressure distributions and plastic strain contours compared to the pure conical socket. The least conventional of them all, model 4, leverages a retaining plate that is stiffer material (akin to steel) at the retaining lip. This retaining plate prevents the gross plastic flow of zinc and concentrates confining pressure and stresses in the wire near the outlet of the socket. It is hypothesized that this type of feature enable more repeatable static and time-dependent failure modes of zinc spelter socket termination designs.

Figure 7:
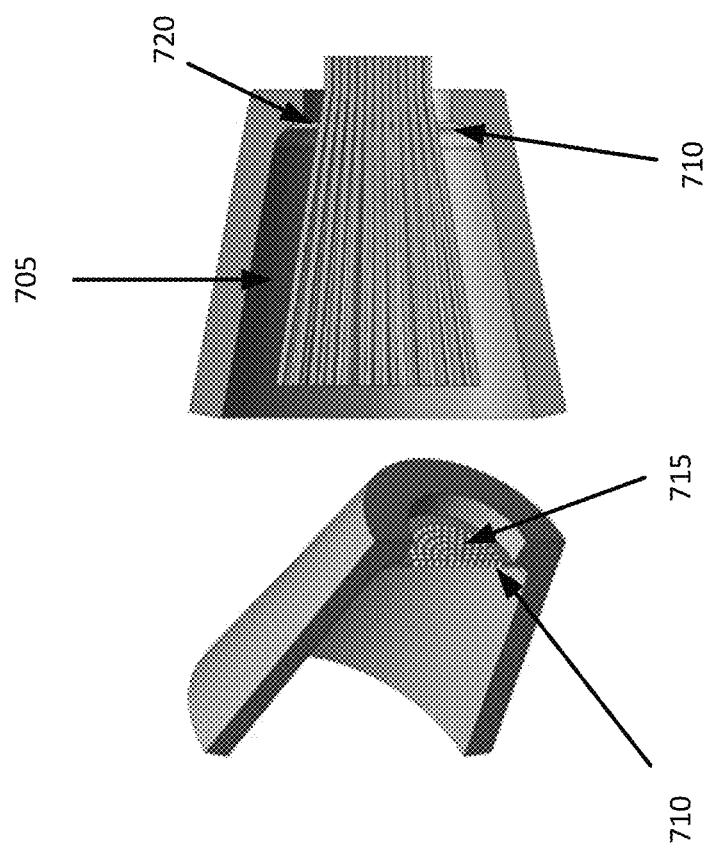
FIG. 7 is a conceptual diagram illustrating a socket joint comprising of a retaining mesh, according to an embodiment of the present invention.

FIG. 7 is a conceptual diagram illustrating a socket joint 700 comprising of a retaining mesh 710, according to an embodiment of the present invention. As discussed above, socket joints 700 are terminations in stay cables 705 that transfer loads between adjacent structures. Terminations include stay cable wires 705 that are unraveled, broomed, and then embedded/bonded into a zinc casting inside a conical volume of socket joint 700. Cable tension wedges the zinc material against the slanted conical surface of socket joint 700, which then develops a large compression zone within the zinc.

The zinc that fills the cavity of joint socket 700 is bonded to the wires, and this bond creates an efficient load transfer among the wires within joint socket 700. A special characteristic of the zinc spelter socket termination is that the combination of zinc plasticity and the conical volume forces a "squeezing" effect to occur around the broomed wire bundle in the narrow part of joint socket 700. The high confining pressures experienced at the outlet of joint socket 700 keep the broomed wires from pulling out of the zinc and allow the failure to occur in the cable outside the socket In this embodiment, retaining metallic mesh 710, which comprises of a plurality of holes 715 for cable (wires) 705 to traverse through, sits on lip 720 of the outer shell casing of joint socket 700. Retaining metallic mesh 710 prevents the zinc within joint socket 700 to extrude. This provides a consistent failure mode to the outside of joint socket 700, which is the preferred failure mode in these applications so as to ensure repeatable failure modes and more reliability of these cable assembly designs.

FIG. 8 is a flow diagram illustrating a method 800 for constructing an open socket joint to prevent zinc creep in an open socket joint, according to an embodiment of the present invention. In some embodiments, method 800 includes installing seizing at the termination of the socket. In an embodiment, "tie off" a portion of the cable at root location where the individual wires will not separate.

At 805, method 800 includes brooming the wires by unwinding and straightening out the wire segments above the seizing. The wires form an expanded shape to occupy the volume of the conical socket. At 810, method 800 includes ultrasonically cleaning the broomed wires by dipping in a solvent and then drying. At 815, method 800 includes applying a flux by dipping for a prescribed time and then allowing to dry.

At 820, method 800 includes installing the socket hardware around the broomed wires, ensuring the cable is aligned concentrically with the socket at the location of seizing. At 825, method 800 includes sealing the opening of the socket to ensure no molten zinc can flow from the bottom of the socket. At 830, method 800 includes preheating the socket to a specified value to better match thermal shock of molten zinc pour.

At 835, method 800 installing a retaining mesh that sits on a lip, and at 840, filling the headed socket with molten zinc. At 845, method 800 includes applying a target temperature for pouring zinc between 800 to 875 degrees Fahrenheit.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An open socket joint configured to prevent zinc creep, comprising:
   a rounded and curved lip on an outer shell casing of the open socket joint with a zinc casting inside of a conical volume of the open socket joint, wherein
   the open socket joint has a doubly curved socket geometry with the rounded and curved lip being a rounded wire-outlet-lip; and
   a retaining mesh comprising a plurality of holes configured to prevent zinc within the open socket joint to extrude, wherein
   the retaining mesh sits on the rounded and curved lip.

2. The open socket joint of claim 1, wherein the plurality of holes facilitate insertion of stay cable wires into the retaining mesh.

3. The open socket joint of claim 1, wherein the retaining mesh is configured to prevent a gross plastic flow of zinc and concentrate confining of pressure and stresses in stay cable wires near an outlet of the open socket joint.

4. The open socket joint claim 3, wherein the stay cable wires are unraveled and broomed inside of the open socket joint.

5. The open socket joint of claim 1, wherein the rounded and curved lip of the outer shell casing is rounded, allowing the retaining mesh to fit against the outer shell casing of the open socket joint.

6. The open socket joint of claim 1, wherein the retaining mesh prevents gross plastic flow of the zinc and concentrates confining pressure and stresses in stay cable wires near an outlet of the open joint socket.

7. The open joint socket of claim 1, further comprising
   a cavity configured to act as a termination point in stay cable wires for transferring loads between two adjacent structures.

8. The open joint socket of claim 7, wherein the cavity is filled with zinc, the zinc being bonded to the stay cable wires creating load transfer among the stay cable wires within open joint socket.

9. The open joint socket of claim 8, wherein a plasticity of the zinc and a conical volume forces a squeezing effect around the stay cable wires in a narrow portion of the open joint socket.

10. An open socket joint configured to prevent zinc creep, comprising:
    a cavity configured to act as a termination point in stay cable wires for transferring loads between two adjacent structures;

a rounded and curved lip on an outer shell casing of the open socket joint with a zinc casting inside of a conical volume of the open socket joint, wherein the open socket joint has a doubly curved socket geometry with the rounded and curved lip being a rounded wire-outlet-lip; and a retaining mesh comprising a plurality of holes configured to prevent zinc within the open socket joint to extrude, wherein the retaining mesh sits on the rounded and curved lip.

11. The open socket joint of claim 10, wherein the plurality of holes facilitate insertion of the stay cable wires into the retaining mesh.

12. The open socket joint of claim 10, wherein the retaining mesh is configured to prevent a gross plastic flow of zinc and concentrate confining of pressure and stresses in the stay cable wires near an outlet of the open socket joint.

13. The open socket joint claim 12, wherein the stay cable wires are unraveled and broomed inside of the open socket joint.

14. The open socket joint of claim 10, wherein the rounded and curved lip of the outer shell casing is rounded, allowing the retaining mesh to fit against the outer shell casing of the open socket joint.

15. The open socket joint of claim 10, wherein the retaining mesh prevents gross plastic flow of the zinc and concentrates confining pressure and stresses in the stay cable wires near an outlet of the open joint socket.

16. The open joint socket of claim 10, wherein the cavity is filled with zinc, the zinc being bonded to the stay cable wires creating load transfer among the stay cable wires within open joint socket.

17. The open joint socket of claim 16, wherein a plasticity of the zinc and a conical volume forces a squeezing effect around the stay cable wires in a narrow portion of the open joint socket.

18. An open socket joint configured to prevent zinc creep, comprising:

a cavity configured to act as a termination point in stay cable wires for transferring loads between two adjacent structures;

a rounded and curved lip on an outer shell casing of the open socket joint with a zinc casting inside of a conical volume of the open socket joint, wherein the open socket joint has a doubly curved socket geometry with the rounded and curved lip being a rounded wire-outlet-lip; and a retaining mesh comprising a plurality of holes configured to prevent zinc within the open socket joint to extrude, wherein the retaining mesh sits on the rounded and curved lip.

19. The open socket joint of claim 18, wherein the plurality of holes facilitate insertion of the stay cable wires into the retaining mesh.

20. The open socket joint of claim 18, wherein the retaining mesh is configured to prevent a gross plastic flow of zinc and concentrate confining of pressure and stresses in the stay cable wires near an outlet of the open socket joint.

* * * * *